United States Patent [19]
Chen et al.

[11] Patent Number: 5,768,133
[45] Date of Patent: Jun. 16, 1998

[54] WIP/MOVE MANAGEMENT TOOL FOR SEMICONDUCTOR MANUFACTURING PLANT AND METHOD OF OPERATION THEREOF

[75] Inventors: Archin Chen, Miao-Lieh Shien; Yu-Ning Chen, Taipei; Chiu-Fang Chien; Chung I. Chieh, both of Hish-chu, all of Taiwan

[73] Assignee: Taiwan Semiconductor Manufacturing Company, Ltd., Hsin-Chu, Taiwan

[21] Appl. No.: 618,178

[22] Filed: Mar. 19, 1996

[51] Int. Cl.[6] ............................................. G06F 17/30
[52] U.S. Cl. .............. 364/468.01; 364/286; 364/468.15; 711/115; 395/401; 395/105
[58] Field of Search ............................ 364/468.01, 468.5, 364/468.16, 468.18, 240.2, 283.3, 286.2, 286, 468.15, 918.4, 974; 395/326, 329, 526, 893–894, 615, 701, 703, 705, 707, 833; 711/115, 114; 707/102

[56] References Cited

U.S. PATENT DOCUMENTS

| 4,831,582 | 5/1989 | Miller et al. | 395/615 |
|---|---|---|---|
| 4,901,223 | 2/1990 | Rhyne | 395/893 |
| 4,962,466 | 10/1990 | Revesz et al. | 395/214 |
| 4,972,367 | 11/1990 | Burke | 395/615 |
| 5,111,404 | 5/1992 | Kotani | 364/468.15 |
| 5,187,788 | 2/1993 | Marmelstein | 395/703 |
| 5,210,041 | 5/1993 | Kobayashi et al. | 437/8 |
| 5,219,765 | 6/1993 | Yoshida et al. | 437/8 |
| 5,240,866 | 8/1993 | Friedman et al. | 437/8 |
| 5,450,545 | 9/1995 | Martin et al. | 395/701 |
| 5,548,756 | 8/1996 | Tantry et al. | 395/615 |
| 5,664,146 | 9/1997 | Bolin et al. | 711/115 |

Primary Examiner—James P. Trammell
Assistant Examiner—Bryan Bui
Attorney, Agent, or Firm—George O. Saile; Stephen B. Ackerman; Graham S. Jones, II

[57] ABSTRACT

An interactive data processing system and/or method is a management tool for a manufacturing plant including a shop floor control system. A server contains a data engine for extracting data, a load and transform data unit, and a database management storage unit. Data from the shop floor control system is supplied to the data engine in the server. The data engine can run the shop floor control system. The data engine supplies data received from the shop floor control system to the load and transform data unit. The load and transform data unit supplies data to the database management storage unit where the data is stored in a disk storage unit in storage space allocated to a conventional database management system employed for the purpose of management of data. The database management storage unit supplies data to an interactive graphic user interface.

10 Claims, 13 Drawing Sheets

HOT Lot List by EQPTYPE

EQPTYPE: QA-SCOPE

| EQPTYPE | LOTID | TECHGRP1 | LOTTYPE | TOTMAINQTY |
|---|---|---|---|---|
| QA-SCOPE | B39721.1 | | 1~4XXXX | 24 |
| QA-SCOPE | B39612.1 | | 1~4XXXX | 24 |
| QA-SCOPE | B91596.1 | | 9XXXX | 23 |
| QA-SCOPE | B80465.1 | | 6XXXX | 11 |
| QA-SCOPE | B91572.1 | | 9XXXX | 10 |

Record: 1 of 59

FIG. 12

WIP/MOVE MANAGEMENT TOOL FOR SEMICONDUCTOR MANUFACTURING PLANT AND METHOD OF OPERATION THEREOF

BACKGROUND OF THE INVENTION

1. Field of the Invention

This invention relates to tools for management of semiconductor manufacturing.

2. Description of Related Art

A need exists for a manufacturing data system which has open architecture permitting shop floor data to be used in an interactive fashion.

SUMMARY OF THE INVENTION

In accordance with this invention, an interactive data processing system and/or method comprises a management tool for a manufacturing plant including a shop floor control system. A server contains a data engine for extracting data, a load and transform data unit, and a database management storage unit. Data from the shop floor control system is supplied to the data engine in the server. The data engine is operative to run the shop floor control system. The data engine supplies data received from the shop floor control system to the load and transform data unit. The load and transform data unit supplies data to the database management storage unit where the data is stored in a disk storage unit in storage space allocated to a conventional database management system employed for the purpose of management of the data therein. The database management storage unit supplies data to an interactive graphic user interface.

Preferably, the graphic user interface includes a display presenting interactive menus for securing real-time data on manufacturing data as a function of a plurality of menus for WIP management, move, special lot and classification functions, and providing for selection of chart options by interactive functions.

In accordance with another aspect of this invention, an interactive data processing method and/or system comprises a management tool for a manufacturing plant in which a set of database storage units are connected respectively to a set of data extraction engines which have outputs which are, in turn, connected to provide data to a first bus line, the extraction engines extracting and transforming data from the set of database storage units. The first bus line is connected to the input of a common data temporary storage unit which stores the data supplied thereto by the data extraction engines. A database server is connected to receive data via the first bus line from the storage unit during a loading and maintenance function of the server. The data from the server is supplied to a common data warehouse attached to the server employing a database management system. The server has a reciprocal input/output connection to a second bus line. A set of graphic user interfaces having reciprocal input/output connections to the second bus line. The graphic user interface has a local data storage unit.

Preferably, the graphic user interface includes a display presenting interactive menus for securing real-time data on manufacturing data as a function of a plurality of menus for WIP management, move, special lot and classification functions, and providing for selection of chart options by interactive functions.

BRIEF DESCRIPTION OF THE DRAWINGS

The foregoing and other aspects and advantages of this invention are explained and described below with reference to the accompanying drawings, in which:

FIG. 12 shows a screen displaying sandwich (Hot Lot EQTYPE by Stage.)

DESCRIPTION OF THE PREFERRED EMBODIMENT

The system of the present invention is useful for improving management of semiconductor manufacturing plants by providing the features as follows:

1. Making WIP (Work In Process) data easily accessible on a real time basis to personnel associated with and managing the manufacturing environment.
2. Providing an easily operated, user-friendly graphical interface.
3. Providing a computer system which is oriented towards the user and capable of presenting a user defined WIP/MOVE graph with various grouping criteria.

Problems which have existed in industry are overcome with the system of this invention for reasons as follows:

1. Since key factors for fabrication plant dispatching, machine status and stage WIP status, are both dynamic, decision makers (management or supervisory personnel) have access to real-time information to provide optimum dispatching.
2. A graphical users interface provides management level personnel a more direct, efficient and friendly tool for monitoring desired WIP/MOVE data in one system simply by choosing function keys. Thus, users can access data in an integrated environment.

3. Computer CPU time/resources are use economically, since, without running various programs, a user desiring data can acquire the desired data with the system of this invention.

4. This system allows a user to extract and download data to a computer, so that data can be edited as the user desires.

To achieve desired output and enhance line balance of a semiconductor fabrication plant, work in progress (WIP) status of each of the stages in a manufacturing line is the key factor of dispatching and scheduling. Currently, WIP status is monitored by means of producing a periodic text report, e.g. generated usually every 3–6 hours. If a user wants to access data with other attributes, the only way is to create and run separated codes.

1. Data Source/Data Extraction/Interface
   Client Server Environment

Figure 1:
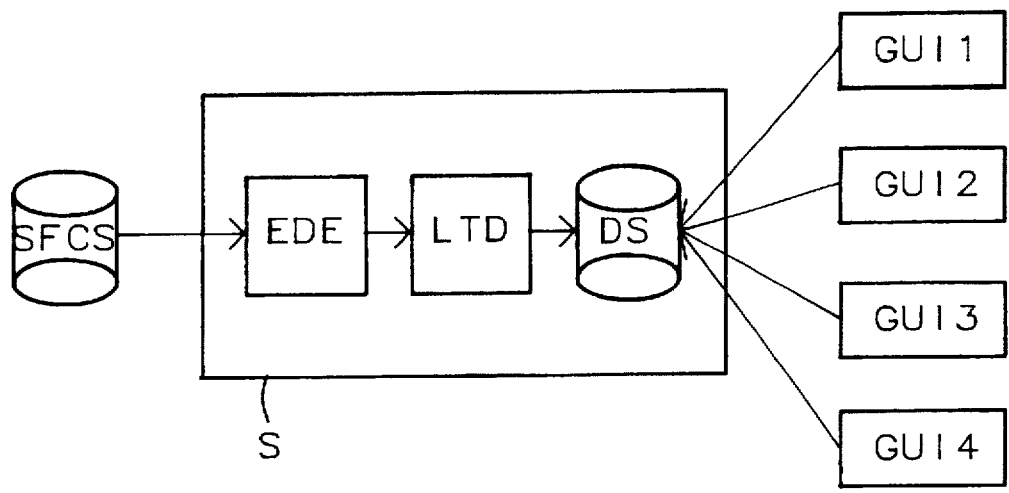
FIG. 1 is a schematic diagram of a system permitting a set of Graphic User Interfaces (GUI) to substitute current text report providing Data Source/Data Extraction/Interface in a clientserver environment for use by users at a set of GUI devices.

This system permits a set of Graphic User Interfaces (GUI) to substitute current text report as shown in FIG. 1, providing Data Source/Data Extraction/Interface in a client-server environment for use by users at a set of GUI devices.

The shop floor control system SFCS supplies data to a server S. Server S contains an extract data engine EDE, a Load and Transform Data unit LTD, and a database management storage unit DS. The data from system SFCS is supplied to the extract data engine EDE in server S. The exact data engine EDE is used otherwise to run the shop floor control system. Then the data engine EDE, in turn, supplies the data received to the Load and Transform Data unit LTD which supplies it to the database management storage unit DS where the data is stored in a disk storage unit in storage space allocated to a conventional database management system employed for the purpose of management of the data therein. Then the data in the data base management system where the data is stored in a disk storage unit DS is accessed by a set of GUI devices GUI1, GUI2, GUI3, and GUI4. The server S can be perceived to be a black box to a user using any one of the GUI devices.

An important feature of the system is its modularized program which is the only communication route between the client and the server to facilitate maintenance and revision.

Figure 3:
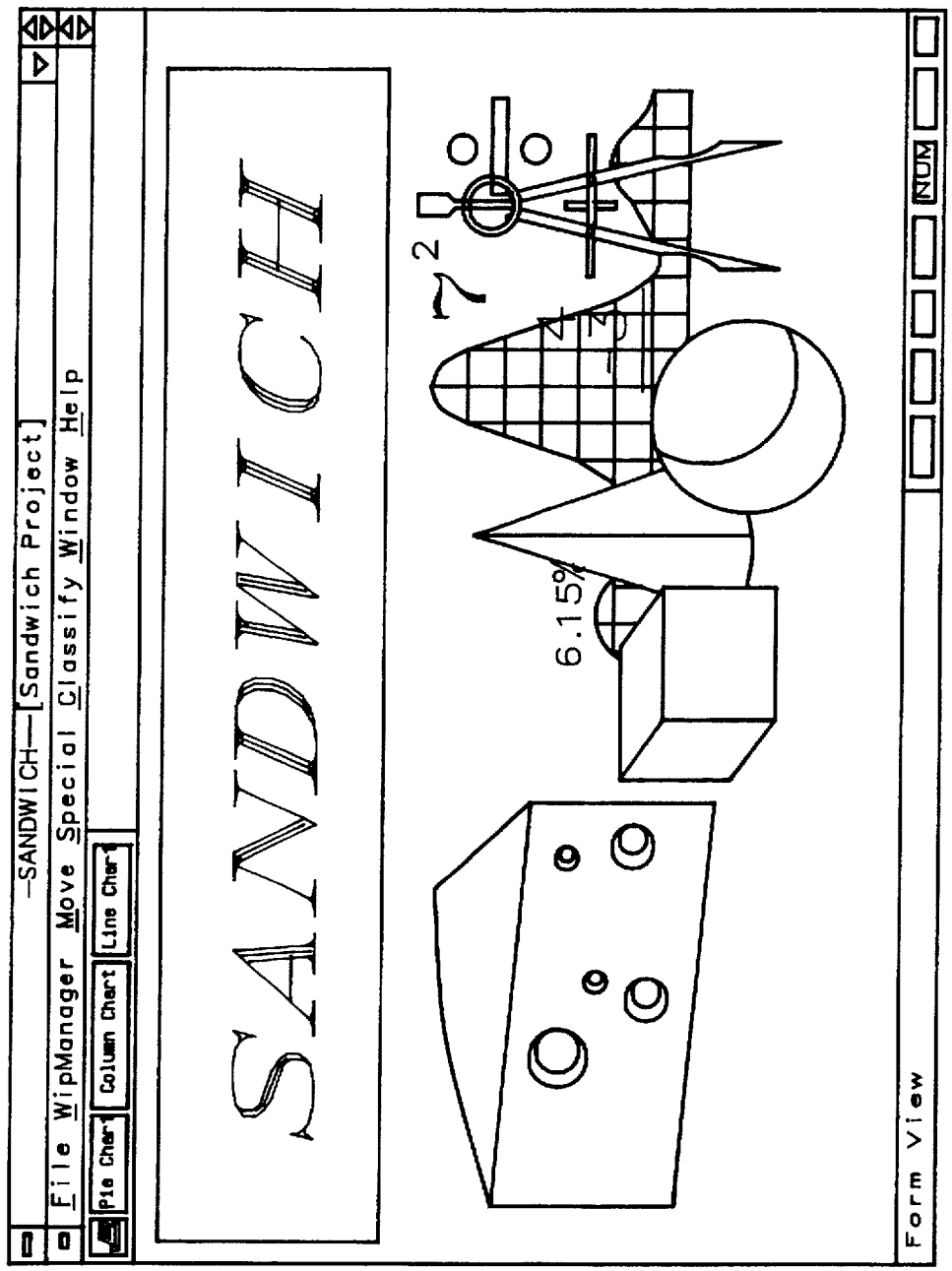
FIG. 3 shows a graphic depiction of a Main Menu screen of the Sandwich program used in the system of this invention on on a GUI terminal to access data. The Main Menu screen has selection indicia used for access to features of the Sandwich (System Analysis of Dynamic WIp Chart) software program. The SANDWICH screen has a number of touch and ALT letter controls for accessing various functions as follows.

FIG. 3 shows a graphic depiction of a Main Menu screen of the Sandwich program is used in the system of this invention on a GUI terminal to access data. The Main Menu screen has selection indicia used for access to features of the Sandwich (System Analysis of Dynamic WIp Chart) software program. The SANDWICH screen has a number of touch and ALT letter controls for accessing various functions as follows:

File WipManager Move Special Classify Window Help

In addition there are four windows for controlling access to functions such as PRINTing, a Pie Chart, a Column chart, and a Line Chart.

| PRINT | Pie Chart | Column chart | Line Chart |
|---|---|---|---|

| MENU SYMBOLS ON SCREEN | FUNCTION PRODUCED BY ACTIVATING SYMBOL |
|---|---|
| FILE | Open FILE Control Menu |
| WIP | Open WIP Management Menu |
| LOT MOVE | Open LOT MOVE Menu |
| Special LOT | Open Special LOT Menu |
| Classify LOT | Open Clasuify LOT Menu |
| WINDOW | Access WINDOW function |
| HELP | Access HELP files |

-continued

| PRINT | Pie Chart | Column chart | Line Chart |
|---|---|---|---|

| WINDOW SYMBOLS ON SCREEN | FUNCTION PRODUCED BY ACTIVATING SYMBOL |
|---|---|
| Line Chart | Change chart type to Line Chart |
| Column Chart | Change chart type to Column Chart |
| Pie Chart | Change chart type to Pie Chart |
| Print Symbol | Print Chart |

2. Report Function

The report function enables users to switch to the raw data of a given graph. It generates alarm tables which contain information of lots whose stage Q-time exceeds a given limit to better manage in-line status. The report function also allows a user to extract and download data to another system, so that raw data can be converted into other forms in accordance with user desire.

Figure 4:
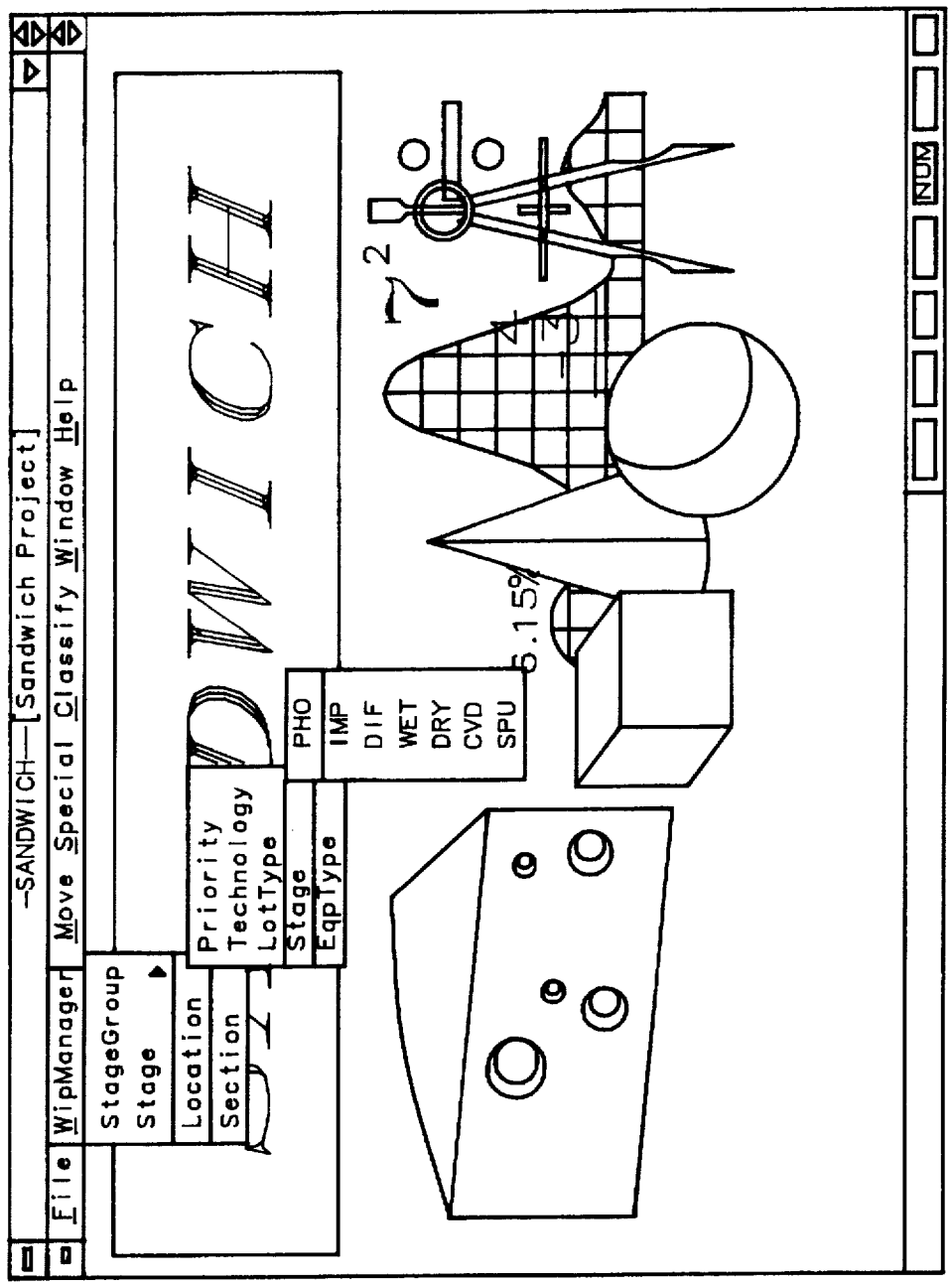
FIG. 4 shows a screen displaying menus for and selected for location and stage.

3. Functions:

The system of FIG. 3 presents five types of functions:

A. Wip manager: Referring to FIG. 4, contains WipManagr and cumulate WIP charts of the grouping criteria as follows:

1. Stage group
2. Stage
3. Location/Stage
    Priority    See FIG. 5.
    Technology  See FIGS. 6 and 10.
    Lot Type
    Stage
       PHO
       IMP
       DIF
       WET
       DRY
       CVD
       SPU
    Eqp Type
4. MFG-Section B. Move:

Contains daily Move and target Move charts of the following grouping criteria. This function monitors the output of each stage and compares the daily targets by the functions as follows:

1. Stage group
2. Stage
3. Shift
4. Location
5. MFG_Section.

C. Special Lot: Three kinds of special lots are defined as below.

1. Hold lot: The lot is handled by the engineer or the customer to hold lots in process.
2. Hot lot: The lot is handled with the highest priority (priority=1.)
3. Push lot: The lot is handled with priority=2.

Technology
Lot Type
Stage
EqpType
   Technology

| Lot Type |
|---|
| PHO |
| IMP |
| DIF |
| WET |
| DRY |
| CVD |
| SPU |

D. Classify:

Classify total WIP by technology, priority or lot type using different colors.

Figure 2:
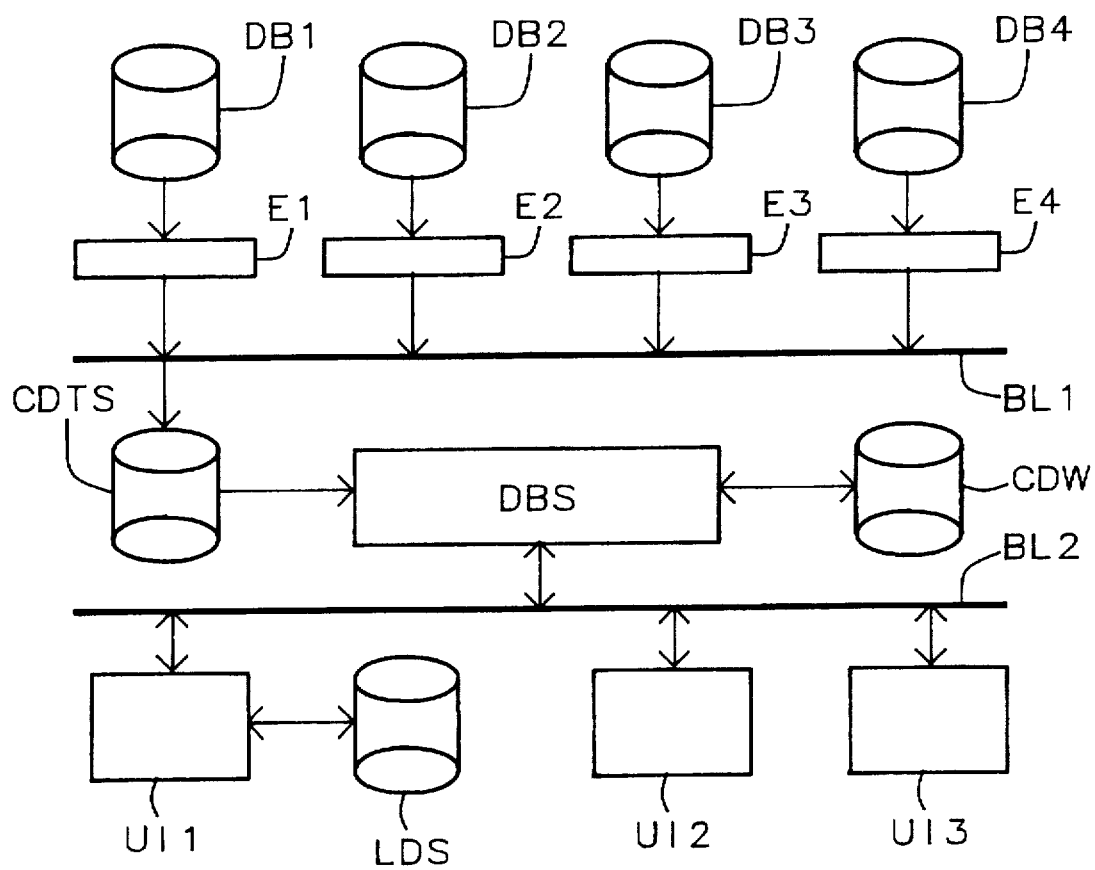
FIG. 2 shows another embodiment of the present invention. A plurality of database storage units are connected respectively to data extraction engines which have outputs which are, in turn, connected to provide data to a bus line.

FIG. 2 shows another embodiment of the present invention. A set of database storage units DB1, DB2, DB3, and DB4 are connected respectively to data extraction engines E1, E2, E3, and E4 which have outputs which are, in turn, connected to provide data to bus line L1. The extraction engines extract and transform data functions in accordance with the requirements of the system of this invention.

Bus line L1 is connected to the input to common data temporary storage unit CDTS which stores the data supplied by the data extraction engines E1, E2, E3, and E4.

A database server DBS receives the data in the storage unit CDTS during a loading and maintenance function thereof. That data in turn is supplied to the common data warehouse CDW attached to server DBS. The common data warehouse can employ a conventional database management system. The database server system DBS is operated either on a batch or a real time basis.

Server DBS has a reciprocal input/output connection to a second bus line BL2.

A set of graphic user interfaces UI1, UI2, and UI3 have reciprocal input/output connections to the second bus line BL2, and graphic user interface UI1 has a local data storage unit LDS which is for example the disk drive of the graphic user interface UI1. Graphic user interfaces UI1, UI2, and UI3 are employed in obtaining report and making queries of the system. In addition the graphic user interfaces UI1, UI2, and UI3 are used for various user applications.

An advantage of this invention is that since machine, WIP, and manufacturing line status are all dynamic functions of time, real-time information is available to permit very effective dispatching actions to be taken. This system permits real-time operation, GUI, editability, and integration of all user desired data. WIP data is available on a real-time basis, the GUI is user friendly, and a user oriented, present WIP/MOVE graph is provided with user defined grouping criteria.

In summary a number of the drawings show as follows:

FIG. 4 shows a screen displaying menus for WipManager and selected for location and stage.

Figure 5:
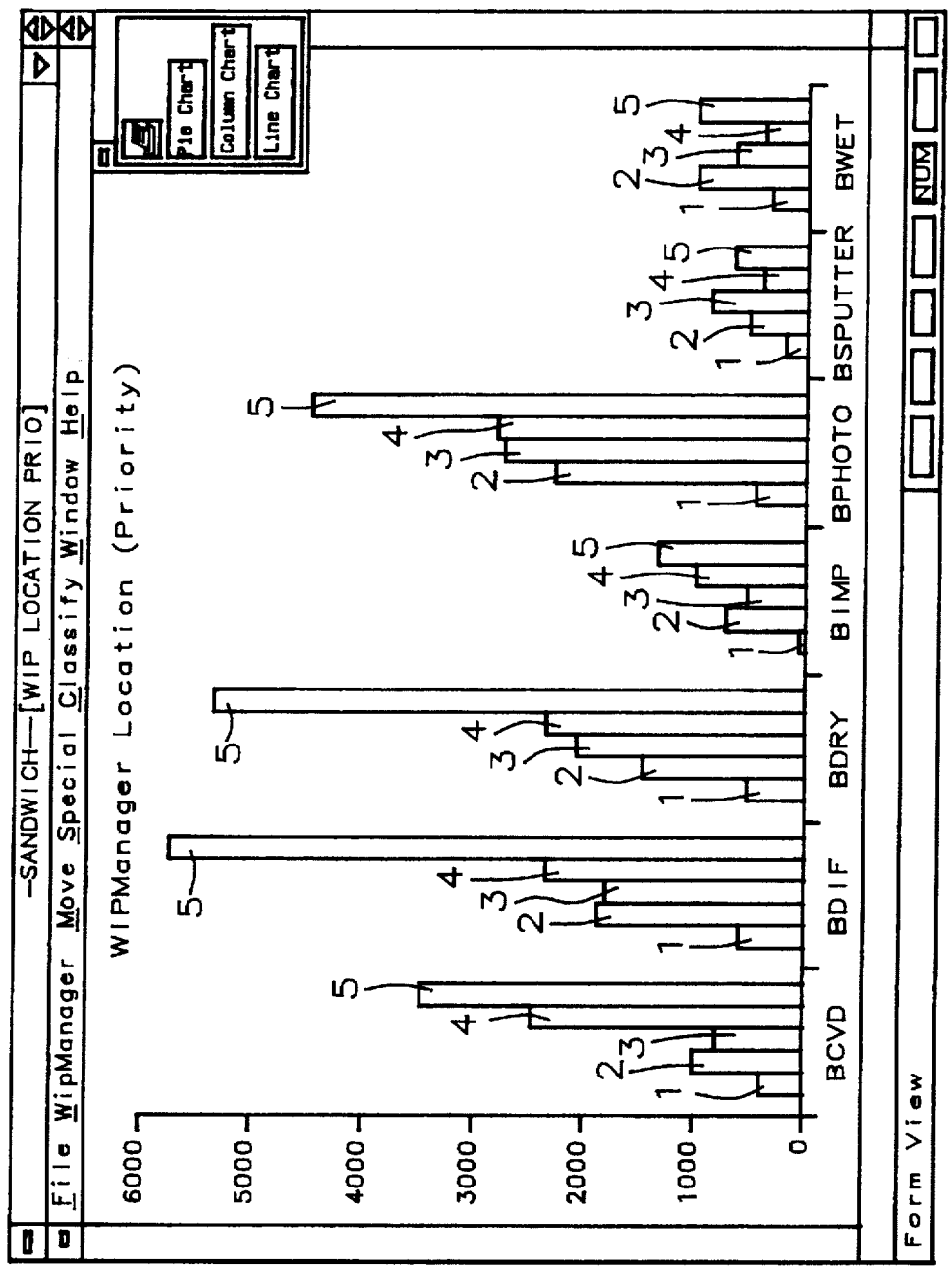
FIG. 5 is a screen displaying a bar graph chart of WIP quantity in terms of a number of wafers by location with a separate bar for each of five priority levels from 1 to 5.

FIG. 5 shows a screen displaying a bar graph chart of WIP quantity in terms of a number of wafers by location with a separate bar for each of five priority levels from 1 to 5 for the seven BCVD, BDIF, BDRY, BIMP, BPHOTO BSPUTTER and BWET processing locations. On the actual screen, the bars are shown coded by color and patterned with a window showing the key to the coding but they are shown as bars marked with reference characters for convenience of illustration.

Figure 6A:
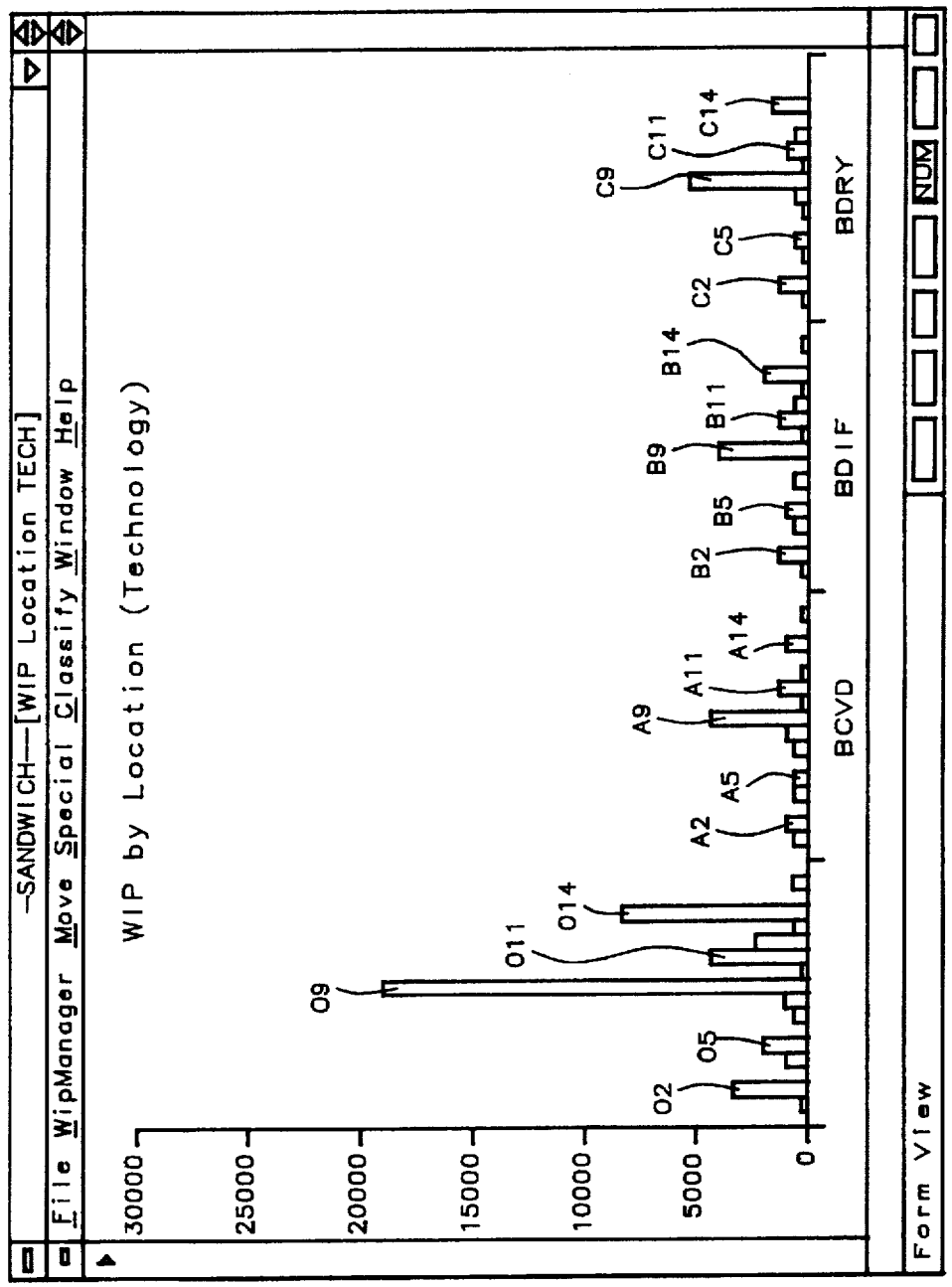
FIGS. 6A and 6B show screens displaying a pair of charts of WIP by location (technology.)
Figure 6B:
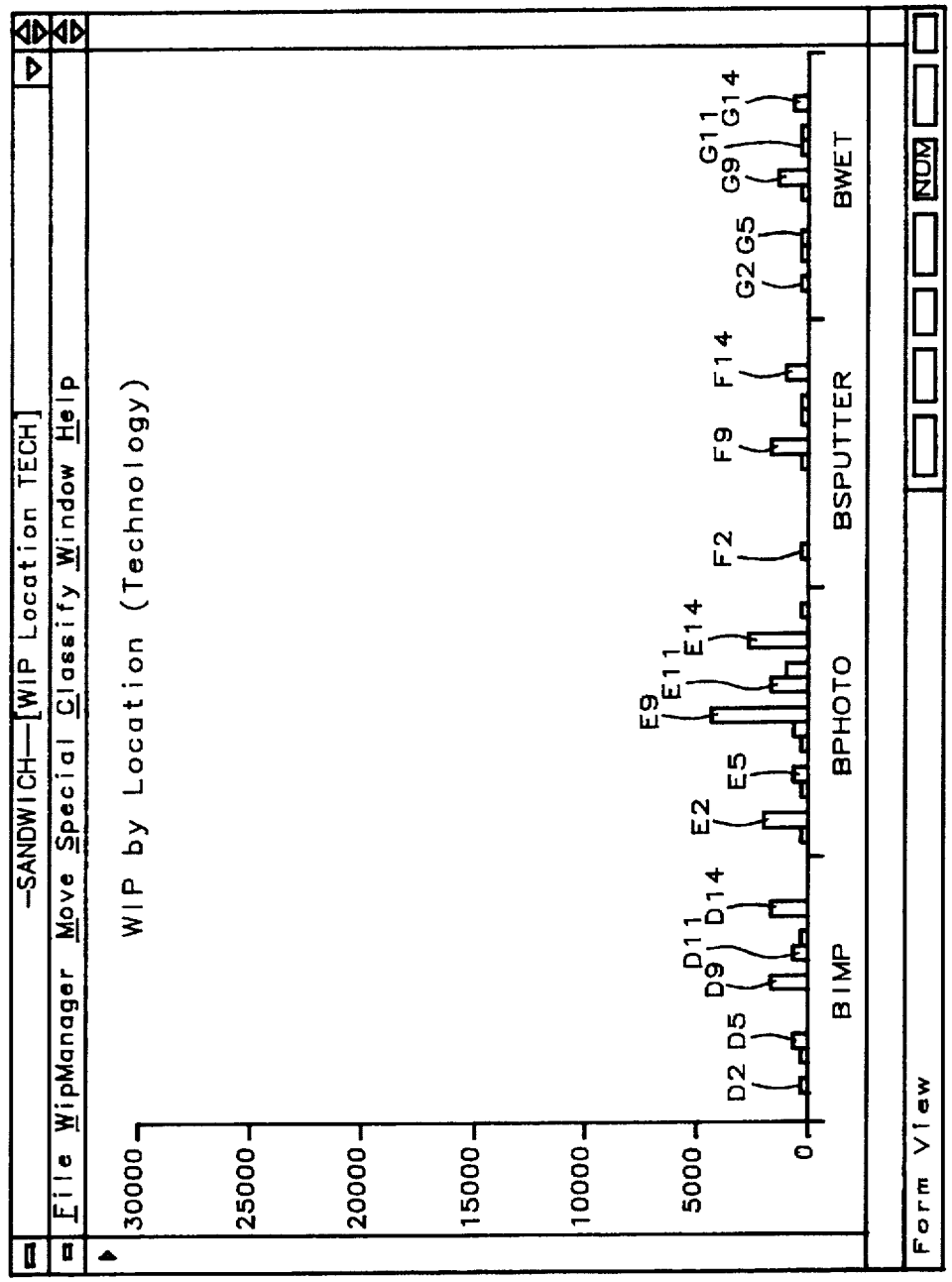

FIGS. 6A and 6B show two screens (for convenience of illustration although the actual display is on one screen) displaying a chart of WIP by location (technology) with values of 1) CPU05, 2) DRAM05, 3) DRAM06, 4) EPLD08, 5) EPROM08, 6) FLASH07, 7) FLASH08, 8) LOGIC05, 9) LOGIC06, 10) LOGIC08, 11) MIXED06, 12) NONE, 13) SRAM04, 14) SRAM05, 15) SRAM06, and 16) SRAM65.

FIG. 6A shows bar graphs from 01 to 016 for the overall fabrication unit. Additional bar graphs are shown from A1 to A16 for BCVD, from B1–B16 for BDIF, from C1 to C16 for BDRY. FIG. 6B shows bar graphs from D1 to D16 for BIMP, from E1 to E16 for BPHOTO from F1 to F16 for BSPUTTER and from G1 to G16 for BWET processing locations. On an actual screen, the bars are coded by color and patterned with a window showing the key to the coding, but herein they are shown as monochromatic bars marked with reference characters for convenience of illustration.

Figure 7:
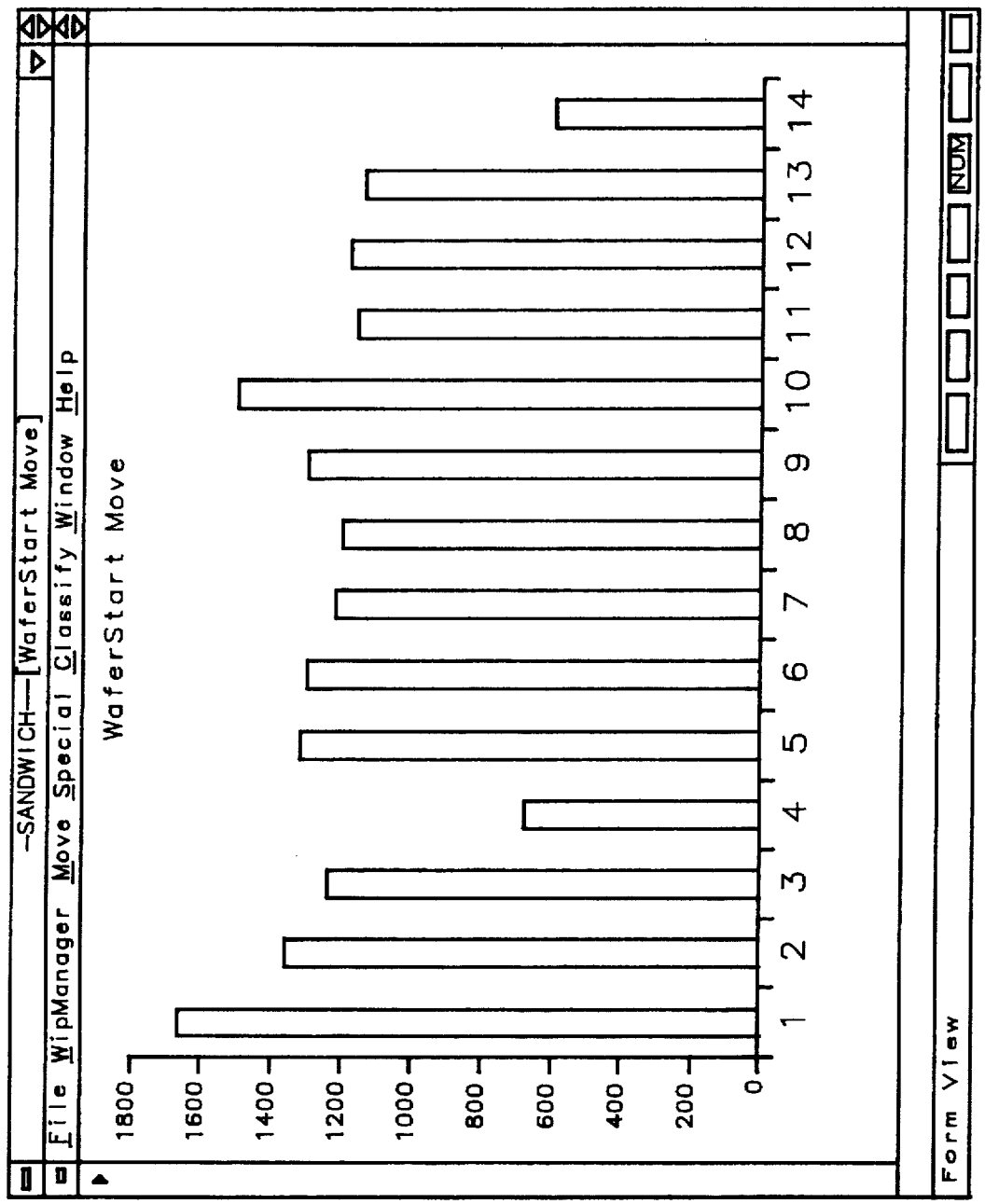
FIG. 7 shows a screen displaying a waferstart move chart.

FIG. 7 shows a screen displaying a waferstart move chart of bar graphs for ten consecutive days for SRAM65, SRAM05, NONE, MIXED06, LOGIC08, LOGIC06, FLASH08, EPROM08, EPLD08, DRAM05, CPU05, and <>. An actual display is a series of bar charts of different colors and patterns displaying fractions of the bars shown, which are shown as monochromatic unitary bars for convenience of illustration. On the actual screen, the bars are shown coded both by color and patterning with the screen including a window showing the key to the coding but the bars are shown herein with indicia for convenience of illustration.

Figure 8:
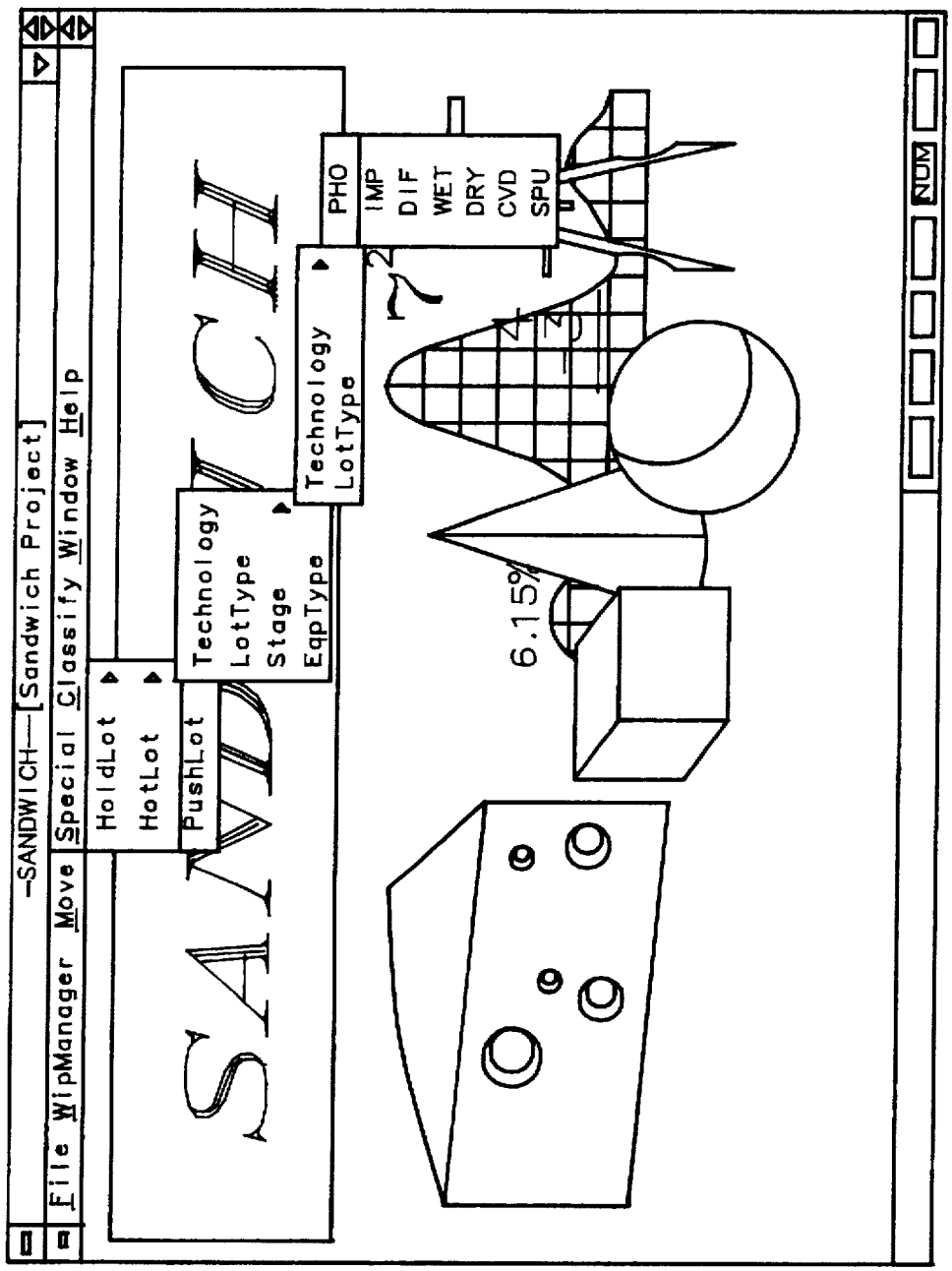
FIG. 8 shows a screen displaying a set of Special menus under technology lot type.

FIG. 8 shows a screen with a set of Special menus under technology lot type with Lot, Stage, and Lot Type set of menus.

Figure 9A:
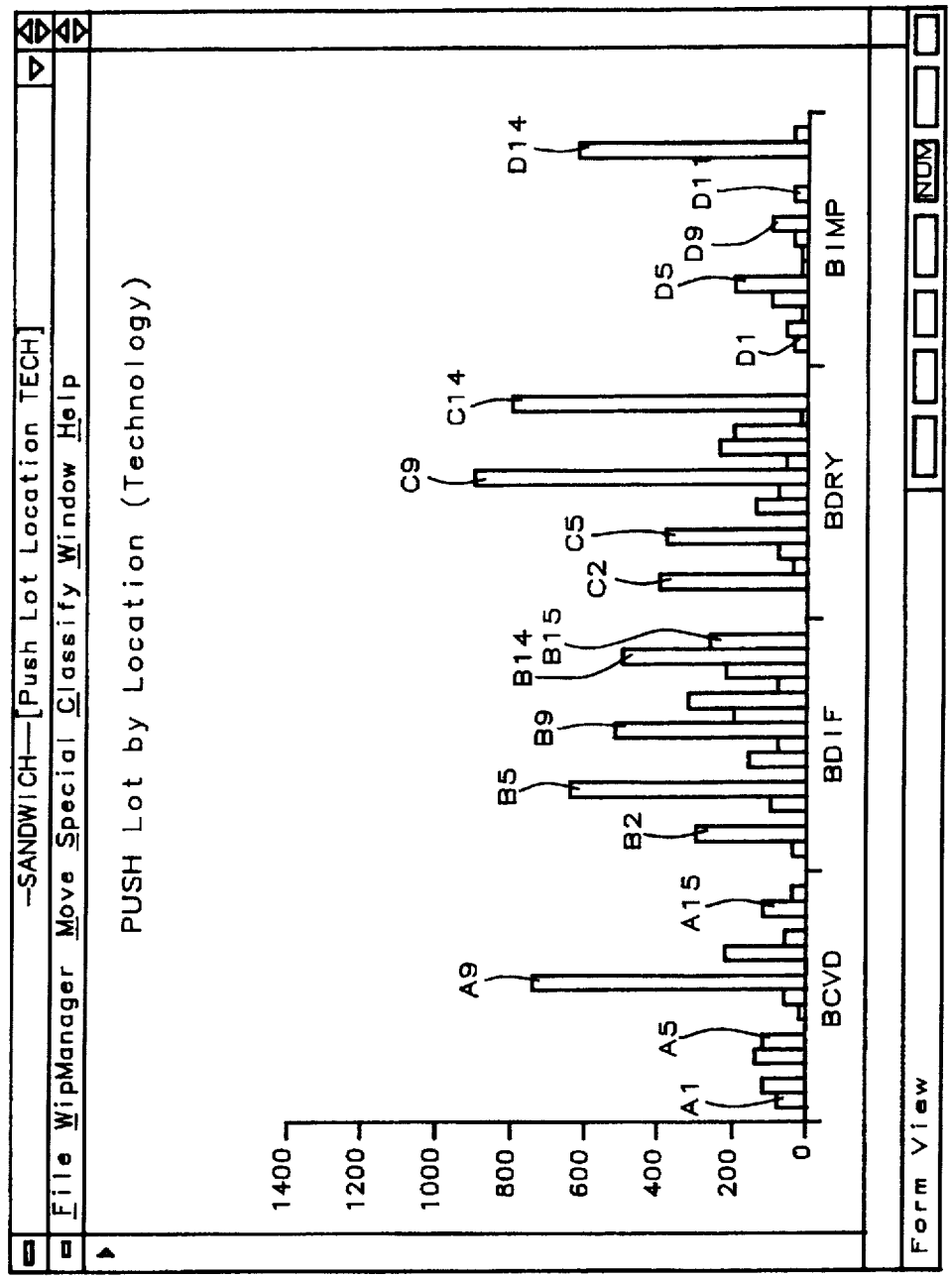
FIGS. 9A and 9B show screens displaying a pair of charts showing waferstart move with Push Lot Location for lots of priority "2" and "3" as contrasted with "HOT" priority "1" lots.
Figure 9B:
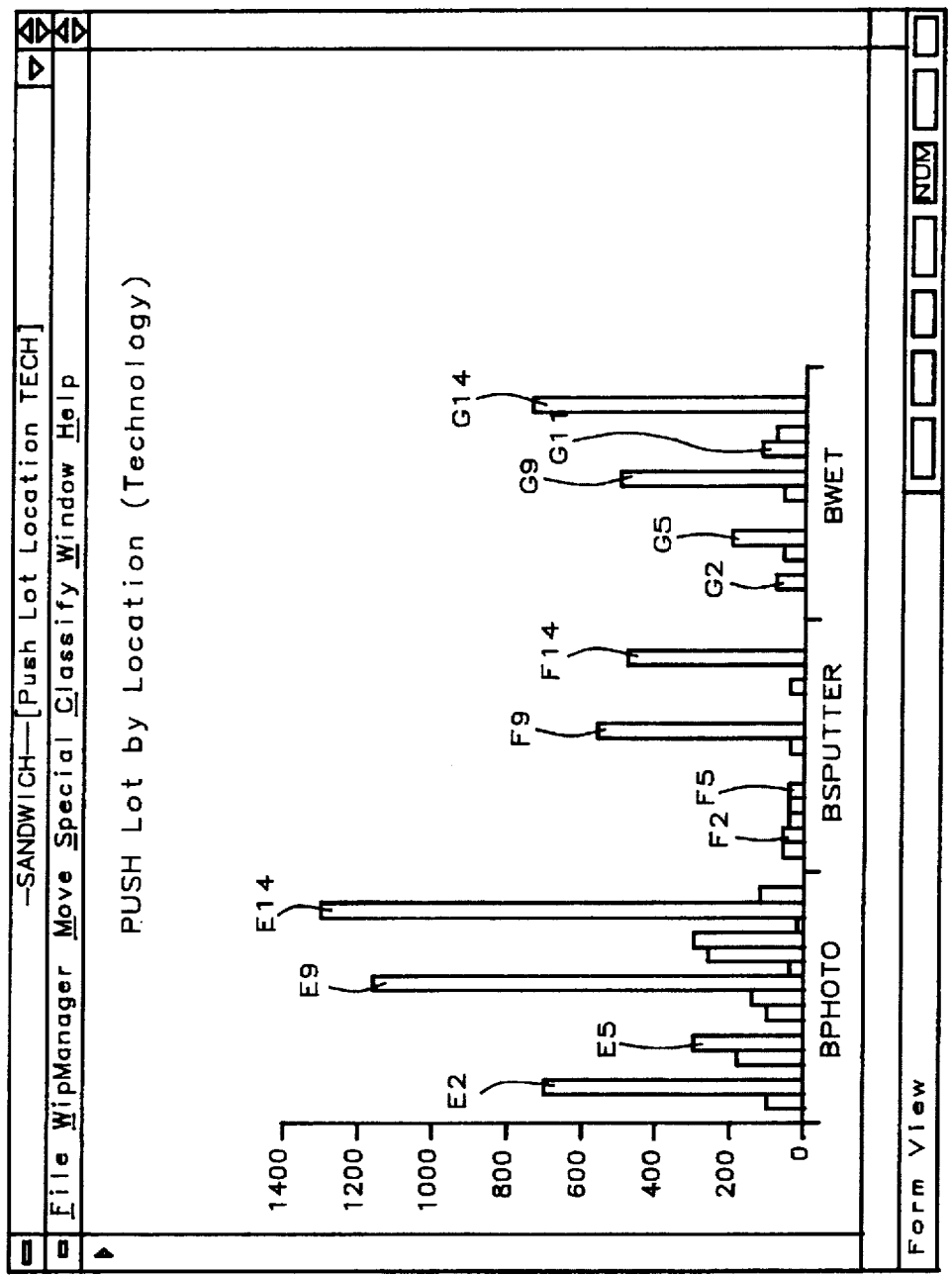

FIGS. 9A and 9B show two screens (for convenience of illustration although the actual display is on one screen) displaying charts of bar graphs. The screens show waferstart move with Push Lot Location for lots of priority "2" and "3" as contrasted with "HOT" priority "1" lots with values of 1) CPU05, 2) DRAM05, 3) DRAM06, 4) EPLD08, 5) EPROM08, 6) FLASH07, 7) FLASH08, 8) LOGIC05, 9) LOGIC06, 10) LOGIC08, 11) MIXED06, 12) NONE, 13) SRAM04, 14) SRAM05, and 15) SRAM65 with bar graphs from from A1 to A15 for BCVD, from B1–B15 for BDIF, from C1 to C15 for BDRY in FIG. 9A. In FIG. 9B the bar graphs are shown from D1 to D15 for BIMP, from E1 to E15 for BPHOTO from F1 to F15 for BSPUTTER and from G1 to G15 for BWET processing locations. On the actual screen, the bars are shown coded coded both by color and patterning with the screen including a window showing the key to the coding by color, but the bars are with indicia for convenience of illustration.

Figure 10:
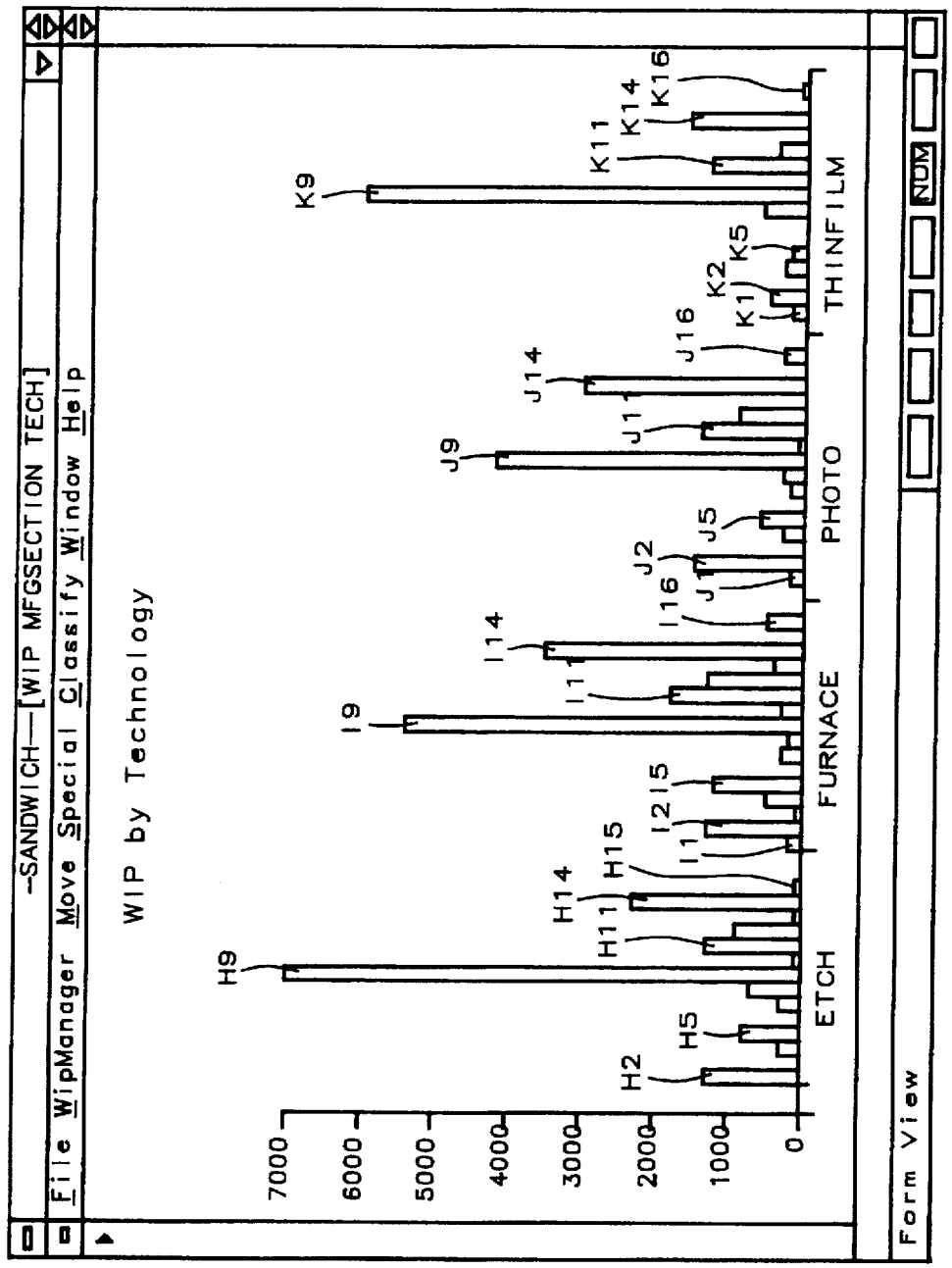
FIG. 10 shows a screen displaying a chart of WIP by technology for the etch, furnace, photo and thin film sections.

FIG. 10 shows a screen displaying a bar graph chart of WIP by technology for the etch, furnace, photo and thin film sections with values of 1) CPU05, 2) DRAM05, 3) DRAM06, 4) EPLD08, 5) EPROM08, 6) FLASH07, 7) FLASH08, 8) LOGIC05, 9) LOGIC06, 10) LOGIC08, 11) MIXED06, 12) NONE, 13) SRAM04, 14) SRAM05, 15) SRAM06, and 16) SRAM65. The bar graphs are from H1 to H16 for the ETCH section, from I1–I16 for the FURNACE section, from J1 to J16 for the PHOTO section, and from K1 to K16 for THIN FILM processing section. On the actual screen, the bars are shown coded coded both by color and patterning with the screen including a window showing the key to the coding by color, but the bars are with indicia for convenience of illustration.

Figure 11:
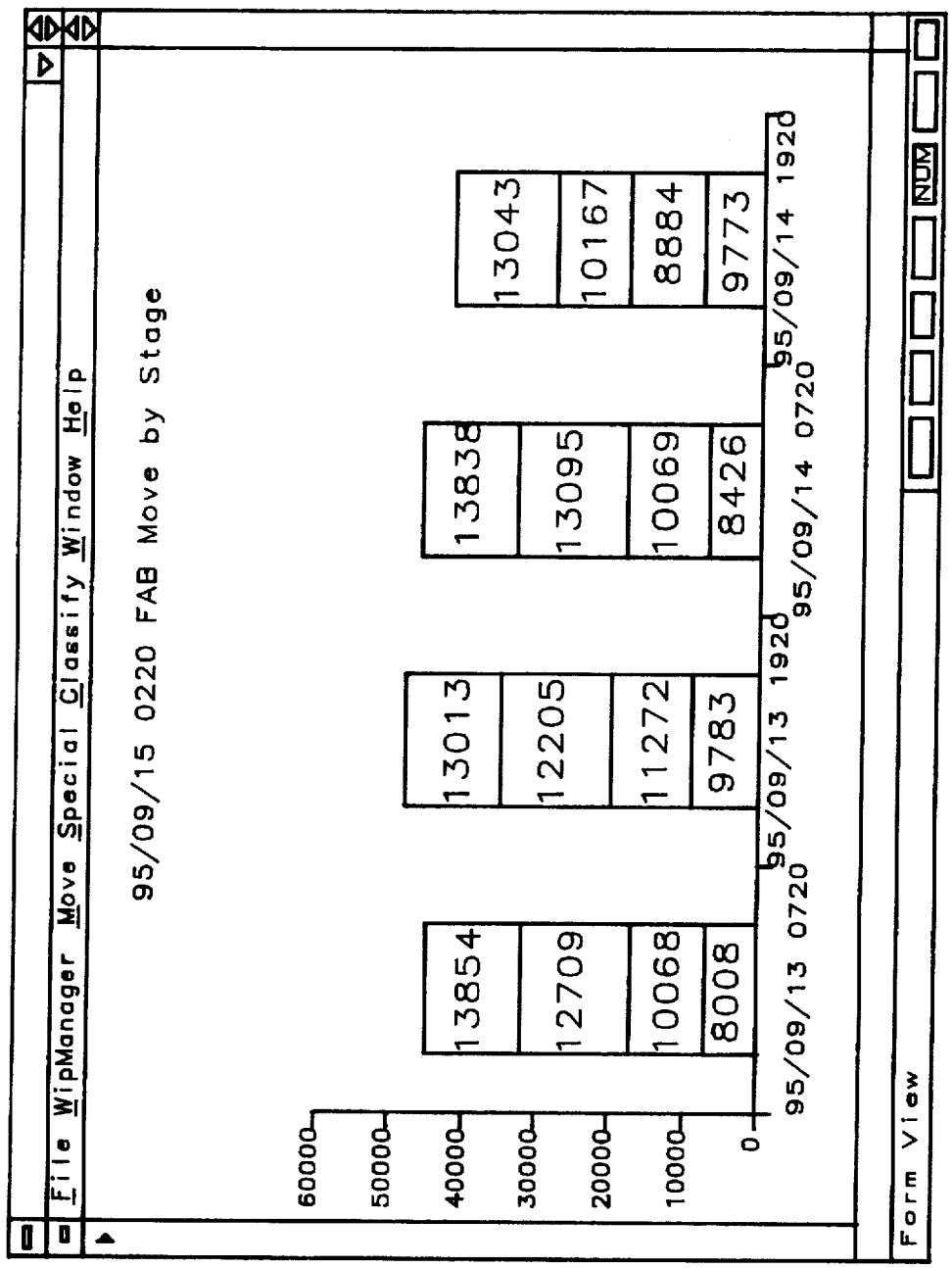
FIG. 11 shows a screen displaying a graph of the number of wafers in a FAB Move by stage at a number of successive times on two consecutive days.

FIG. 11 shows a screen displaying a graph of the number of wafers in a FAB Move by stage at a number of successive times on two consecutive days.

FIG. 12 is a screen displaying sandwich (Hot Lot EQTYPE by Stage.)

While this invention has been described in terms of the above specific embodiment(s), those skilled in the art will recognize that the invention can be practiced with modifications within the spirit and scope of the appended claims, i.e. that changes can be made in form and detail, without departing from the spirit and scope of the invention. Accordingly all such changes come within the purview of the present invention and the invention encompasses the subject matter of the claims which follow.

Having thus described the invention, what is claimed as new and desirable to be secured by Letters Patent is as follows:

1. An interactive data processing system comprising a management tool for a manufacturing plant including:

a set of database storage units connected respectively to a set of data extraction engines which have outputs which are, in turn, connected to provide data to a first bus line, said extraction engines extracting data and transforming said data from said set of database storage units, said first bus line being connected to the input of a common data temporary storage unit which stores the data supplied thereto by said data extraction engines, a database server connected to receive data via said first bus line from said storage unit during a loading and maintenance function of said server, data from said server being supplied to a common data warehouse attached to said server employing a database management system, said server having a reciprocal input/output connection to a second bus line, a set of graphic user interfaces having reciprocal input/output connections to the second bus line, and said graphic user interface having a local data storage unit.

2. A system in accordance with claim 1 wherein:

said graphic user interface includes a display presenting interactive menus for securing real-time data on manufacturing data as a function of a plurality of menus.

3. A system in accordance with claim 1 wherein:

said graphic user interface includes a display presenting interactive menus for securing real-time data on manufacturing data as a function of a plurality of menus for WIP management, move, special lot and classification functions.

4. A system in accordance with claim 1 wherein:

said graphic user interface includes a display presenting interactive menus for securing real-time data on manufacturing data as a function of a plurality of menus providing for selection of chart options by interactive functions.

5. A system in accordance with claim 1 wherein:

said graphic user interface includes a display presenting interactive menus for securing real-time data on manufacturing data as a function of a plurality of menus for WIP management, move, special lot and classification functions, and providing for selection of chart options by interactive functions.

6. An interactive data processing method comprising a management tool for a manufacturing plant including:

a set of database storage units connected respectively to a set of data extraction engines which have outputs which are, in turn, connected to provide data to a first bus line, said extraction engines extracting data and transforming said data from said set of database storage units, sending data on said first bus line to the input of a common data temporary storage unit which stores the data supplied thereto by said data extraction engines, causing a database server to receive data via said first bus line from said storage unit during a loading and maintenance function of said server, supplying data from said server to a common data warehouse attached to said server employing a database management system, said server having a reciprocal input/output connection to a second bus line, operating a set of graphic user interfaces having reciprocal input/output connections to the second bus line to control display of data from said server, and said graphic user interface having a local data storage unit.

7. A method in accordance with claim 6 wherein:

said graphic user interface includes a display presenting interactive menus for securing real-time data on manufacturing data as a function of a plurality of menus.

8. A method in accordance with claim 6 wherein:

said graphic user interface includes a display presenting interactive menus for securing real-time data on manufacturing data as a function of a plurality of menus for WIP management, move, special lot and classification functions.

9. A method in accordance with claim 6 wherein:

said graphic user interface includes a display presenting interactive menus for securing real-time data on manufacturing data as a function of a plurality of menus providing for selection of chart options by interactive functions.

10. A method in accordance with claim 6 wherein:

said graphic user interface includes a display presenting interactive menus for securing real-time data on manufacturing data as a function of a plurality of menus for WIP management, move, special lot and classification functions, and providing for selection of chart options by interactive functions.

\* \* \* \* \*